(12) United States Patent
Takahashi et al.

(10) Patent No.: US 9,555,565 B2
(45) Date of Patent: Jan. 31, 2017

(54) APPARATUS FOR AND METHOD OF PRODUCING TWO-COLOR MOLDED ARTICLE

(71) Applicant: Kojima Industries Corporation, Toyota-shi (JP)

(72) Inventors: Daisuke Takahashi, Toyota (JP); Tomoyuki Sato, Toyota (JP)

(73) Assignee: Kojima Industries Corporation, Toyota-Shi (JP)

( * ) Notice: Subject to any disclaimer, the term of this patent is extended or adjusted under 35 U.S.C. 154(b) by 790 days.

(21) Appl. No.: 13/911,559

(22) Filed: Jun. 6, 2013

(65) Prior Publication Data

US 2014/0001673 A1     Jan. 2, 2014

(30) Foreign Application Priority Data

Jul. 2, 2012    (JP) ................................ 2012-148276

(51) Int. Cl.
     *B29C 45/00*      (2006.01)
     *B29C 45/16*      (2006.01)
     *B29C 45/33*      (2006.01)

(52) U.S. Cl.
     CPC ....... *B29C 45/0003* (2013.01); *B29C 45/1675* (2013.01); *B29C 45/33* (2013.01)

(58) Field of Classification Search
     CPC .. B29C 45/0003; B29C 45/1675; B29C 45/16; B29C 45/33

(Continued)

(56) References Cited

U.S. PATENT DOCUMENTS 4,335,068 A * 6/1982 Hemery .............. B29C 45/1639
                                               206/459.5
4,416,602 A * 11/1983 Neumeister ........... B29C 45/062
                                               264/328.7

(Continued)

FOREIGN PATENT DOCUMENTS

| JP | H03-219932 A | 9/1991 |
|---|---|---|
| JP | H10-264202 A | 10/1998 |

(Continued)

OTHER PUBLICATIONS

Japanese Office Action, Japanese Application No. 2012-148276, dated Oct. 6, 2015 (2 pages).

*Primary Examiner* — Nahida Sultana
(74) *Attorney, Agent, or Firm* — Burr & Brown, PLLC

(57) ABSTRACT

An apparatus for producing a two-color molded article, including a pair of primary forming molds, which constitute a primary molding unit for molding a primary molded body by a primary injection molding operation using a first injection unit, are opened while retaining the primary molded body by one of the pair of primary forming molds, and a second injection unit, which constitutes a secondary molding unit for molding a secondary molded body by secondary injection molding operation, is assembled in one of a pair of secondary forming molds with at least part of the second injection unit being accommodated in the one of the pair of secondary forming molds. A secondary molding cavity is formed between the pair of secondary forming molds so as to accommodate at least a part of the primary molded body retained by the above-described one of the pair of primary forming molds.

8 Claims, 10 Drawing Sheets

(58) Field of Classification Search
USPC .......... 264/245, 328.1, 328.15, 328.18, 257; 425/130, 573
See application file for complete search history.

(56) References Cited

U.S. PATENT DOCUMENTS

| | | | | |
|---|---|---|---|---|
| 4,711,621 | A * | 12/1987 | Schomblond | B29C 45/1615 249/161 |
| 5,294,385 | A * | 3/1994 | Hirota | B29C 44/0461 264/328.12 |
| 5,458,361 | A * | 10/1995 | Gajewski | B29C 37/0057 264/242 |
| 6,156,257 | A * | 12/2000 | Tachi | B29B 7/7663 264/102 |
| 6,322,738 | B1 * | 11/2001 | Sicilia | B29C 45/045 264/255 |
| 7,198,315 | B2 * | 4/2007 | Cass | B29C 45/1635 24/297 |
| 7,824,596 | B2 * | 11/2010 | Sicilia | B29C 45/02 264/328.1 |
| 8,414,813 | B2 * | 4/2013 | Jung | B29C 45/045 264/255 |
| 8,974,713 | B2 * | 3/2015 | Kroll | B29C 45/1671 264/255 |
| 2005/0156352 | A1 * | 7/2005 | Burkle | B29C 45/045 264/257 |
| 2006/0125148 | A1 * | 6/2006 | Keir | B29C 45/02 264/328.1 |
| 2008/0054522 | A1 | 3/2008 | Summerer | |
| 2008/0065261 | A1 * | 3/2008 | Grimm | B29C 45/762 700/200 |
| 2009/0148553 | A1 | 6/2009 | Sawada et al. | |
| 2011/0304076 | A1 * | 12/2011 | Halter | B29C 45/1769 264/328.1 |
| 2012/0049408 | A1 * | 3/2012 | Okamoto | B29C 45/045 264/255 |

FOREIGN PATENT DOCUMENTS

| | | | |
|---|---|---|---|
| JP | 2004-01403 | 1/2004 | |
| JP | 2009-78436 | 4/2009 | |
| JP | 2009-143008 A | 7/2009 | |
| JP | 2011-156749 A | 8/2011 | |
| JP | 2011-230345 A | 11/2011 | |
| WO | WO2010031710 A1 * | 3/2010 | ......... B29C 45/1671 |

* cited by examiner

FIG. 10

APPARATUS FOR AND METHOD OF PRODUCING TWO-COLOR MOLDED ARTICLE

The present application is based on Japanese Patent Application No. 2012-148276 filed on Jul. 2, 2012 the contents of which are incorporated herein by reference.

BACKGROUND OF THE INVENTION

Field of the Invention

The present invention relates generally to an apparatus for and a method of producing a two-color molded article, and more particularly to an apparatus for and a method of advantageously producing a two-color molded article which consists of a primary molded body and a secondary molded body and in which the secondary molded body is superposed on the primary molded body such that the primary and secondary molded bodies are bonded together or not bonded together.

Discussion of Related Art

As one kind of resin molded articles, there is a two-color molded article consisting of a primary molded body molded by a primary injection molding operation using a first resin material and a secondary molded body molded by a secondary injection molding operation using a second resin material which is different from the first resin material. In the two-color molded article, the secondary molded body is superposed on the primary molded body such that the primary and secondary molded bodies are bonded together. The two-color molded article is used for components of a vehicle, an electric device, and various kinds of specifically designed products, for example. Recently, it is considered to produce a two-color molded article wherein the secondary molded body is superposed on the primary molded body such that the primary and secondary molded bodies are not bonded together.

In the production of the two-color molded article, an apparatus as disclosed in JP-A-2009-78436 is generally used. The apparatus disclosed in the above-described document comprises a turntable which is rotatable about an axis, first and second lower molds which have respective cavity surfaces of the same shape and which are located on the turntable, first and second upper molds which have respective cavity surfaces of different shapes and which are disposed so as to be movable toward and away from the first and second lower molds, an opening and closing device for moving the first and second upper molds toward and away from the first and second lower molds to close and open the upper and lower molds, and first and second injection units disposed such that their nozzles contact with the first and second upper molds at respective nozzle fitting portions provided on the first and second upper molds.

In the production of the two-color molded article by using the above-described apparatus, the first upper and lower molds are closed by the opening and closing device so as to form a primary molding cavity having a shape corresponding to the primary molded body between the first upper and lower molds. Then, the first resin material in a molten state is injected from the first injection unit so as to fill the primary molding cavity, and the first resin material filled in the primary molding cavity is solidified so as to obtain the primary molded body. The first upper and lower molds are opened by the opening and closing device such that the primary molded body is retained by the first lower mold. Then, the turntable is rotated so that the first lower mold retaining the primary molded body is positioned right below the second upper mold, and the second lower mold is positioned right below the first upper mold. Then, the second upper mold and the first lower mold are closed while the first upper mold and the second lower mold are closed, by the opening and closing device. Thus, a secondary molding cavity having a shape corresponding to the secondary molded body is formed between the second upper mold and the first lower mold with the primary molded body being retained inside the secondary molding cavity, while the primary molding cavity is formed between the first upper mold and the second lower mold. Then, the second resin material in a molten state is injected from the second injection unit so as to fill the secondary molding cavity while the first resin material in a molten state is injected from the first injection unit so as to fill the primary molding cavity. Thus, the secondary molded body is molded so as to be superposed on the primary molded body inside the secondary molding cavity whereby the desired two-color molded article is produced. On the other hand, another primary molded body is molded inside the primary molding cavity. After the two-color molded article is removed by opening the second upper mold and the first lower mold while opening the first upper mold and the second lower mold, the turntable is rotated. The above-described process is repeated.

By using the apparatus having the above-described conventional structure, it is possible to successively produce the desired two-color molded article. However, the conventional apparatus for producing the two-color molded article is configured such that the first and second injection units are disposed in spaces separate from the space in which the two pairs of forming molds (the first upper and lower molds and the second upper and lower molds) are disposed such that the nozzles of the injection units contact with the respective nozzle fitting portions of the first and second upper molds. Therefore, the conventional apparatus for producing the two-color molded article necessarily has an extremely larger size than a general injection molding apparatus having only one injection unit.

In the above-described situation, JP-A-2004-1403, for example, proposes an apparatus for producing the two-color molded article comprising one pair of forming molds and two injection units, wherein at least one of the two injection units is attached to the pair of forming molds. The apparatus makes it possible to reduce the space in which the injection unit attached to the pair of forming molds is disposed, as compared with that of the above-described conventional apparatus, thereby reducing the overall size of the apparatus.

However, the present inventors conducted various studies on the structure of the above-described apparatus for producing the two-color molded article, and found that the apparatus has the following potential problems.

In the apparatus for producing the two-color molded article configured such that the at least one of the first and second injection units is attached to the pair of forming molds, a primary molding cavity having a shape corresponding to the primary molded body is formed by closing the pair of forming molds. A first resin material in a molten state is injected from the first injection unit so as to fill the primary molding cavity and solidified, thereby forming the primary molded body. Then, the pair of forming molds are separated from each other by a predetermined distance, namely, a so called core-back operation is performed, thereby forming a secondary molding cavity between a cavity surface of the at least one of the pair of forming molds and the primary molded body. A second resin material in a molten state is injected from the second injection unit so as to fill the secondary molding cavity and solidified, thereby forming the secondary molded body inside the secondary molding cavity. Thus, the two-color molded article comprising the secondary molded body superposed on the primary molded body is produced.

In the above-described apparatus, the secondary molding cavity is formed by the core-back operation of the pair of forming molds. Therefore, the surface of the secondary molded body remote from the primary molded body necessarily has the same shape as that of the surface of the primary molded body on which the secondary molded body is superposed. As a result, when the above-described apparatus is used, the overall shape of the obtained two-color molded article depends on the shape of the primary molded body, and it is therefore impossible to obtain a two-color molded article having a shape different from that of the primary molded body.

Further, in the above-described apparatus, the pair of forming molds is provided with a slot for injecting the molten resin into the secondary molding cavity, and the pair of forming molds is opened after the core-back operation. Namely, the pair of forming molds is configured so as to successively conduct the primary and secondary injection molding operations. Therefore, it was generally impossible to obtain the primary molded body as the end product by a single primary injection molding operation without a secondary injection molding operation by using the above-described apparatus. Even if it was possible to do so, unnecessary operations such as the core-back operation for molding the secondary molded body should be performed just to obtain the primary molded body.

In other words, the conventional apparatus for producing the two-color molded article, which is configured such that the at least one of the first and second injection units is attached to the pair of forming molds, is intended to be used only for the production of the two-color molded article. It was not possible to use the apparatus as a general injection molding apparatus for producing the molded article by a single primary injection molding operation. Even if it was possible to do so, the productivity of the molded article was insufficient to practically use the apparatus as the injection molding apparatus for producing the molded article by the single primary injection molding operation. The conventional apparatus for producing the two-color molded article, which is configured such that the two injection units are disposed separately from the two pairs of forming molds, is also used only for the production of the two-color molded article. Its structure does not substantially permit the use of the apparatus for both purposes of producing the two-color molded article and producing the molded article by the single primary injection molding operation.

SUMMARY OF THE INVENTION

The present invention was made in view of the background art described above. It is a first object of the present invention to provide an improved production apparatus for a two-color molded article which not only makes it possible to advantageously reduce the overall size of the apparatus, but also makes it possible to produce the two-color molded article comprising the primary and secondary molded bodies superposed on each other and having any desired shape not limited by the shape of the primary molded body, and which can also be advantageously used as a general injection molding apparatus for producing a desired molded article by a single primary injection molding operation. It is a second object of the present invention to provide a method of advantageously producing the two-color molded article with any desired shape not limited by the shape of the primary molded body.

The first object indicated above can be achieved according to a first aspect of the present invention, which provides an apparatus for producing a two-color molded article consisting of a primary molded body molded by a primary injection molding operation using a first resin material, and a secondary molded body which is molded by a secondary injection molding operation using a second resin material and which is superposed on the primary molded body, the apparatus comprising (a) a primary molding unit for molding the primary molded body by the primary injection molding operation, comprising a first opening and closing device, a pair of primary forming molds which are closed by the first opening and closing device to form therebetween a primary molding cavity having a shape corresponding to the primary molded body, and a first injection unit for injecting the first resin material into the primary molding cavity, and (b) a secondary molding unit for molding the secondary molded body by the secondary injection molding operation, comprising a second opening and closing device, a pair of secondary forming molds which are closed by the second opening and closing device to form therebetween a secondary molding cavity having a shape corresponding to the secondary molded body, and a second injection unit for injecting the second resin material into the secondary molding cavity, and wherein (i) the pair of primary forming molds are opened by the first opening and closing device while retaining the primary molded body by one of the pair of primary forming molds of the primary molding unit, (ii) the second injection unit of the secondary molding unit is assembled in one of the pair of secondary forming molds with at least a part of the second injection unit being accommodated in the above-described one of the pair of secondary forming molds such that the second injection unit is movable with the above-described one secondary forming mold, and (iii) the pair of secondary forming molds are disposed on respective opposite sides of the pair of primary forming molds and are movable toward and away from each other in a direction perpendicular to a direction in which the pair of primary forming molds are opened and closed, the pair of secondary forming molds being moved toward each other and closed by the second opening and closing device while the pair of primary forming molds are open such that the secondary molding cavity is formed so as to accommodate at least a part of the primary molded body retained by the above-described one primary forming mold.

According to a preferable form of the first aspect of the present invention, slide rails are provided on respective opposite sides of a part of the above-described one of the pair of primary forming molds, which part retains the primary molded body while the pair of primary forming molds are open, the slide rails extending in the direction perpendicular to the direction in which the pair of primary forming molds are opened and closed, the pair of secondary forming molds being moved toward and away from each other by the second opening and closing device, while being guided by the slide rails.

According to other preferable form of the first aspect of the present invention, the second opening and closing device is constituted by a pair of cylinders, and supporting portions are provided on respective opposite sides of the above-described part of the one of the pair of primary forming molds, which part retains the primary molded body, the pair of cylinders being supported by the supporting portions and connected to the pair of secondary forming molds, the pair of secondary forming molds being closed and opened by operations of the pair of cylinders.

According to another preferable form of the first aspect of the present invention, the apparatus further comprises a control unit for controlling operation of the first opening and closing device, operation of the second opening and closing device, operation of the first injection unit and operation of the second injection unit, the first opening and closing device and the first injection unit being operated without the operations of the second opening and closing device and the second injection unit, under control of the control unit such that only the primary injection molding operation is conducted by the primary molding unit.

According to still another preferable form of the first aspect of the present invention, a hot runner is provided in each of at least one of the pair of primary forming molds, and the first resin material is injected from the first injection unit into the primary molding cavity through the hot runner.

According to a further preferable form of the first aspect of the present invention, a hot runner is provided in each of at least one of the pair of secondary forming molds, and the second resin material is injected from the second injection unit into the secondary molding cavity through the hot runner.

According to a further preferable form of the first aspect of the present invention, a recess is provided in one of the pair of secondary forming molds, and at least a part of the second injection unit is accommodated in the recess.

The second object indicated above can be achieved according to a second aspect of the present invention, which provides a method of producing a two-color molded article consisting of a primary molded body molded by a primary injection molding operation using a first resin material, and a secondary molded body which is molded by a secondary injection molding operation using a second resin material and which is superposed on the primary molded body, the method comprising the steps of: (a) forming a primary molding cavity for molding the primary molded body by closing a pair of primary forming molds; (b) performing the primary injection molding operation by injecting the first resin material in a molten state into the primary molding cavity and solidifying the first resin material in the primary molding cavity; (c) opening the pair of primary forming molds while retaining the primary molded body molded by the primary injection molding operation by one of the pair of primary forming molds; (d) closing a pair of secondary forming molds disposed on respective opposite sides of the pair of primary forming molds so as to be movable toward and away from each other in a direction perpendicular to a direction in which the pair of primary forming molds are opened and closed, while the pair of primary forming molds are open, thereby forming a secondary molding cavity for molding the secondary molded body so as to accommodate at least a part of the primary molded body retained by the above-described one of the pair of primary forming molds; and (e) performing the secondary injection molding operation by injecting the second resin material in a molten state into the secondary molding cavity by an injection unit which is assembled in one of the pair of secondary forming molds with at least a part of the injection unit being accommodated in the above-described one of the pair of secondary forming molds so as to be movable with the above-described one secondary forming mold, and solidifying the second resin material in the secondary molding cavity so as to form the secondary molded body superposed on the primary molded body accommodated in the secondary molding cavity.

The apparatus for producing the two-color molded article according to the present invention is configured such that the second injection unit of the secondary molding unit is attached to one of the pair of secondary forming molds with at least a part of the second injection unit being accommodated therein so as to be movable with the above-indicated one of the secondary forming mold. Therefore, unlike the conventional apparatus wherein the pair of secondary forming molds and the second injection unit are disposed in separate spaces, the apparatus according to the present invention makes it possible to advantageously reduce the space for disposing the second injection unit, thereby effectively reducing the overall size of the apparatus.

The apparatus for producing the two-color molded article according to the present invention is further configured such that the primary molding cavity is formed between the pair of primary forming molds, and such that the secondary molding cavity is formed between the pair of secondary forming molds independently of the primary molding cavity so as to have any desired shape. Therefore, unlike the conventional apparatus wherein the secondary molding cavity is formed by the core-back operation of the pair of primary forming molds using the cavity surface of the primary forming mold, the apparatus according to the present invention makes it possible to effectively solve the problem that the shape of the secondary molded body is limited by the shape of the primary molded body.

The apparatus according to the present invention comprises the primary molding unit for molding the primary molded body including the pair of primary forming molds, the first opening and closing device, and the first injection unit, and the secondary molding unit for molding the secondary molded body including the pair of secondary forming molds, the second opening and closing device, and the second injection unit. The pair of secondary forming molds of the secondary molding unit are disposed on the opposite sides of the pair of primary forming molds of the primary molding unit such that the secondary molding cavity is formed between the pair of secondary forming molds by moving the pair of secondary forming molds toward each other in the direction perpendicular to the opening and closing direction of the pair of primary forming molds. Thus, while the pair of secondary forming molds of the secondary molding unit are open, it is possible to conduct the primary injection molding operation which is similar to the operation conducted by using the general apparatus for producing a molded article by a single injection molding operation, by operating only the primary molding unit and without conducting the secondary injection molding operation. Therefore, the primary molded body can be advantageously produced as the end product while assuring a sufficiently high degree of productivity which is equivalent to that achieved by using the general injection molding apparatus.

The apparatus for producing the two-color molded article according to the present invention not only makes it possible to advantageously reduce the overall size of the apparatus, but also makes it possible to produce the two-color molded article consisting of the primary molded body and the secondary molded body superposed on the primary molded body so as to have any desired shape not limited by the shape of the primary molded body. Further, the apparatus of the present invention can be extremely advantageously used as the general injection molding apparatus for producing the desired molded article by the single primary injection molding operation.

According to the method of producing the two-color molded article according to the present invention, the two-color molded article consisting of the primary molded body and the secondary molded body superposed on the primary molded body can be advantageously produced by using a small-sized apparatus so as to have any desired shape not limited by the shape of the primary molded body.

BRIEF DESCRIPTION OF THE DRAWINGS

The above and other objects, features, advantages of the present invention will be better understood by reading the following detailed description of a preferred embodiment of the present invention, when considered in connection with the accompanying drawings, in which:

FIG. 10 is a view of a step following the step shown in FIG. 9, showing a second resin material injected to fill the secondary molding cavity formed between the pair of secondary forming molds of the secondary molding unit.

DETAILED DESCRIPTION OF THE INVENTION

To further clarify the present invention, there will be described the preferred embodiment of the present invention in detail by reference to the accompanying drawings.

Figure 1:
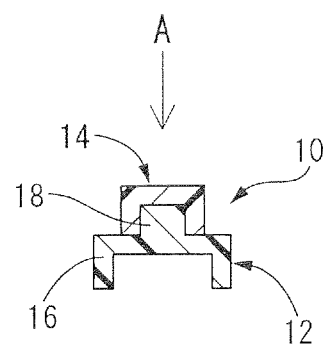
FIG. 1 is a longitudinal cross sectional view of one example of a two-color molded article produced by using an apparatus configured according to the present invention.
Figure 2:
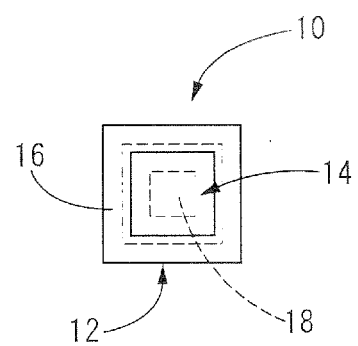
FIG. 2 is a view taken in the direction of an arrow A in FIG. 1.

Referring first to the longitudinal cross sectional view of FIG. 1 and the top plan view of FIG. 2, there is shown a two-color molded article 10 produced by using an apparatus configured according to the present invention. As is apparent from FIGS. 1 and 2, the two-color molded article 10 consists of a primary molded body in the form of a base 12 and a secondary molded body in the form of a covering 14, such that the covering 14 is superposed on the base 12.

The base 12 of the two-color molded article 10 is formed of an ABS resin as a first resin material. The base 12 includes a rectangular casing 16 which is open at its bottom and a protrusion 18 in the form of a rectangular block which is integrally formed at the center of the top surface of the casing 16. The covering 14 is formed of polypropylene as a second resin material and has an overall shape of a rectangular casing which can cover the entirety of the protrusion 18 of the base 12, The covering 14 is superposed on the base 12 so as to fit on the protrusion 18 of the base 12. Thus, the two-color molded article 10 is an assembly consisting of the base 12 and the covering 14.

Figure 3:
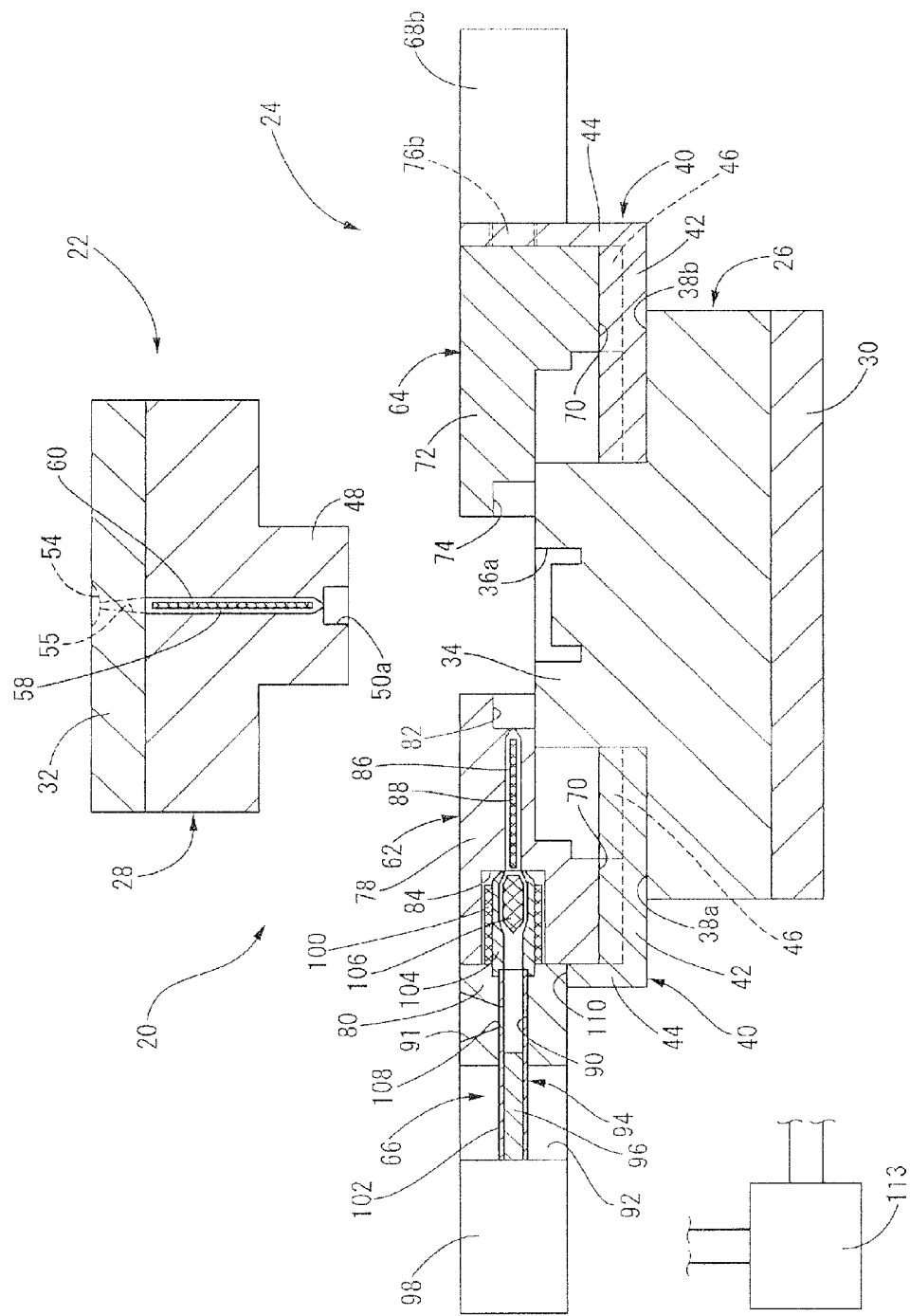
FIG. 3 is a longitudinal cross sectional view taken along a line B-B of FIG. 4, schematically showing the apparatus for producing the two-color molded article, which is configured according to one embodiment of the present invention.

The two-color molded article 10 is produced by using an apparatus 20 configured according to the present invention as shown in FIG. 3, for example. The apparatus 20 includes a primary molding unit 22 for forming the base 12 by injection molding and a secondary molding unit 24 for forming the covering 14 by injection molding.

Figure 6:
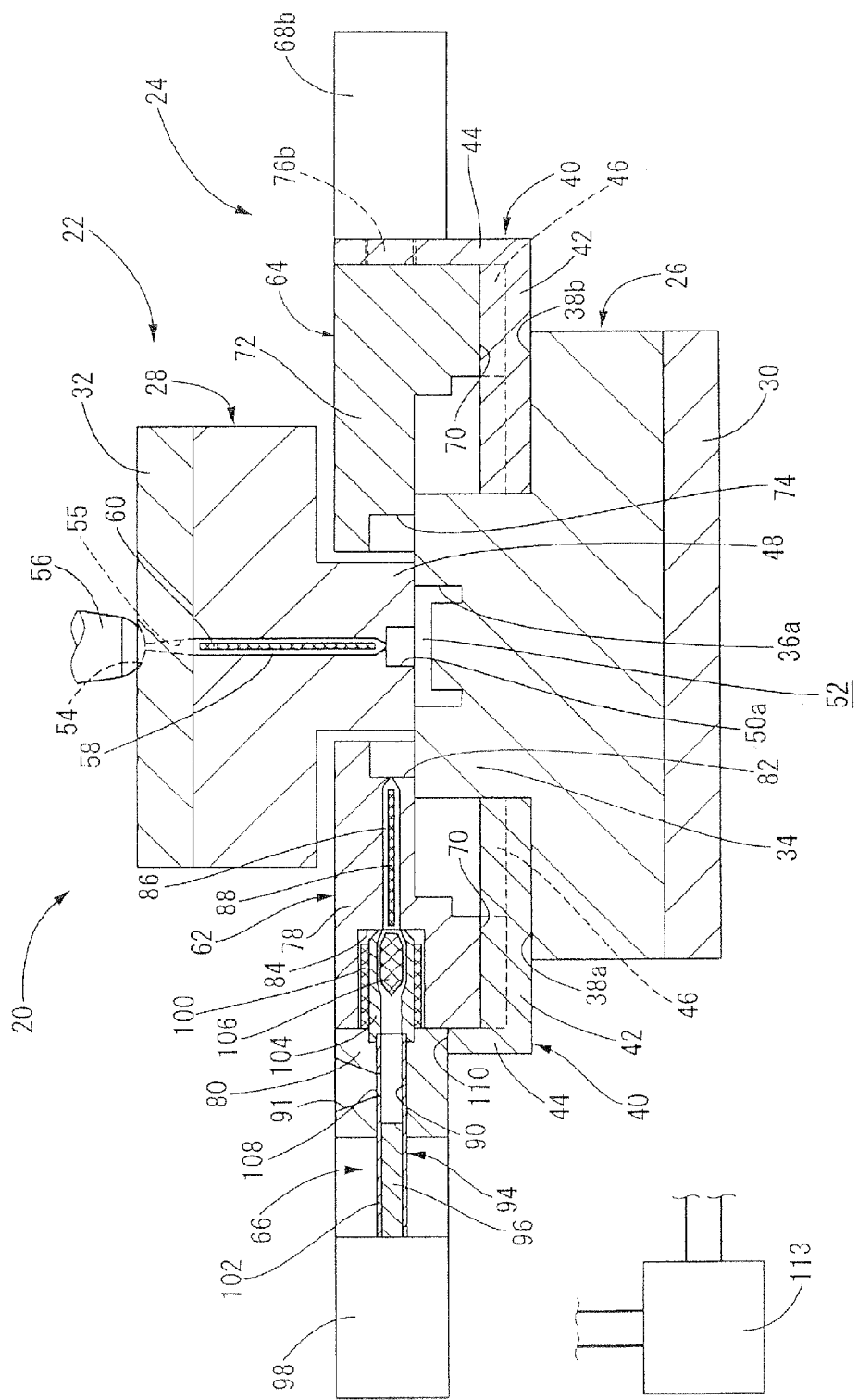
FIG. 6 is a view of a step of a process of producing the two-color molded article by using the apparatus shown in FIG. 3, showing a primary molding cavity formed between the pair of primary forming molds of the primary molding unit.

More specifically described, the primary molding unit 22 has a basic structure similar to that of a general injection molding apparatus for obtaining a desired molded article by a single injection molding operation. Namely, the primary molding unit 22 includes a pair of primary forming molds in the form of a stationary mold 26 and a movable mold 28, a first injection unit (only a nozzle 56 is illustrated in FIG. 6), and a hydraulic cylinder (not shown) serving as a first opening and closing device.

The stationary mold 26 of the primary molding unit 22 is attached to a stationary platen 30 which is fixed in position. The movable mold 28 is attached to a surface of a movable platen 32 spaced upwardly from the stationary platen 30 by a predetermined distance as seen in FIG. 3, which surface is opposed to the stationary platen 30. For convenience of the following description, the vertical direction as seen in FIG. 3 will be simply referred to as the vertical direction, the horizontal direction as seen in FIG. 3 will be simply referred to as the horizontal direction, and the direction perpendicular to the plane of FIG. 3 will be referred to as the front-back direction.

The movable platen 32 to which the movable mold 28 is attached is fixed to an end of a movable ram (not shown) of the hydraulic cylinder (not shown) such that the top surface of the movable platen 32 remote from the stationary platen 30 is in contact with the end of the movable ram. The movable ram of the hydraulic cylinder is operable so as to be moved downwardly (in the direction from the movable platen 32 toward the stationary platen 30) and to be moved upwardly (in the direction from the stationary platen 30 toward the movable platen 32). As the movable ram of the hydraulic cylinder is moved downwardly and upwardly, the movable platen 32 is respectively moved toward and away from the stationary platen 30. Thus, the downward and upward movements of the movable ram of the hydraulic cylinder as the first opening and closing device causes the movable mold 28 to move toward and away from the stationary mold 26 in the vertical direction such that the movable mold 28 and the stationary mold 26 are closed and opened (see FIG. 6).

Figure 4:
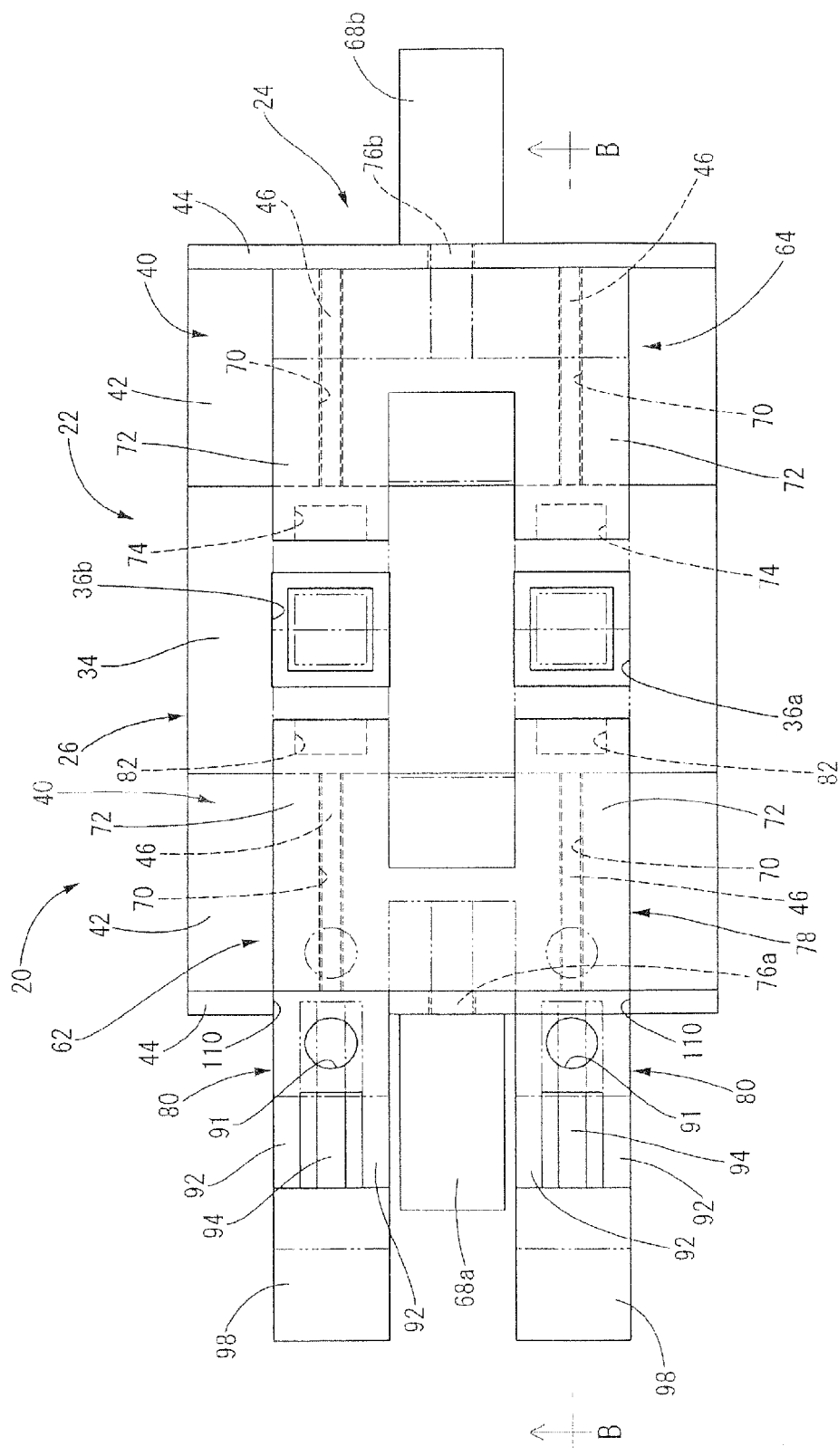
FIG. 4 is a top plan view of one of a pair of primary forming molds of a primary molding unit and a secondary molding unit included in the apparatus shown in FIG. 3.

As shown in FIGS. 3 and 4, the stationary mold 26 has an overall shape of a rectangular block. A protruding portion 34 is provided on the top surface of the stationary mold 26, which top surface is remote from the stationary platen 30 and opposed to the movable mold 28, such that the protruding portion 34 protrudes upwardly from a horizontally central portion of the top surface. The protruding portion 34 has a flat top surface opposed to the movable mold 28. Two cavity portions 36a, 36b for forming cavities on the side of the stationary mold 26 are formed in the flat top surface so as to be spaced apart from each other by a predetermined distance in the front-back direction. Both of the two cavity portions 36a, 36b have a shape corresponding to the external shape of the casing 16 of the base 12 of the desired two-color molded article 10.

Since the protruding portion 34 is provided in the horizontally central portion of the stationary mold 26, the opposite end portions of the stationary mold 26 as seen in the horizontal direction respectively serve as a left step portion 38a and a right step portion 38b, which have the same height lower than the top surface of the protruding portion 34. Two support plates 40 are fixed on respective top surfaces of the left and right step portions 38a, 38b.

Each of the support plates 40 consists of a planar fixing plate portion 42 and a planar supporting plate portion 44, which are formed integrally with each other. The fixing plate portion 42 has a longitudinal length larger than that of the left and right step portions 38a, 38b. The two fixing plate portions 42 are disposed such that one longitudinal end portion of the left fixing plate portion 42 projects outwardly from the left end face of the left step portion 38a while one longitudinal end portion of the right fixing plate portion 42 projects outwardly from the right end face of the right step portion 38b. The supporting plate portion 44 is integrally provided on the end portion of the corresponding fixing plate portion 42 projecting from the left end face of the left step portion 38a or the right end face of the right step portion 38b. The two supporting plate portions 44 protrude from top surfaces of the respective left and right step portions 38a, 38b, so as to have a height larger than that of the protruding portion 34, and so as to be opposed to the protruding portion 34.

Two slide rails 46, 46 are integrally formed in each of the fixing plate portions 42 of the support plates 40. The two slide rails 46, 46 are disposed so as to be spaced apart from each other by a predetermined distance in the front-back direction and extend parallel to each other over the entire length of the fixing plate portions 42 in the horizontal direction. Namely, the two slide rails 46, 46 are provided in both of the left and right step portions 38a, 38b of the stationary mold 26 so as to extend outwardly from the left end face of the left step portion 38a and the right end face of the right step portion 38b.

Figure 5:
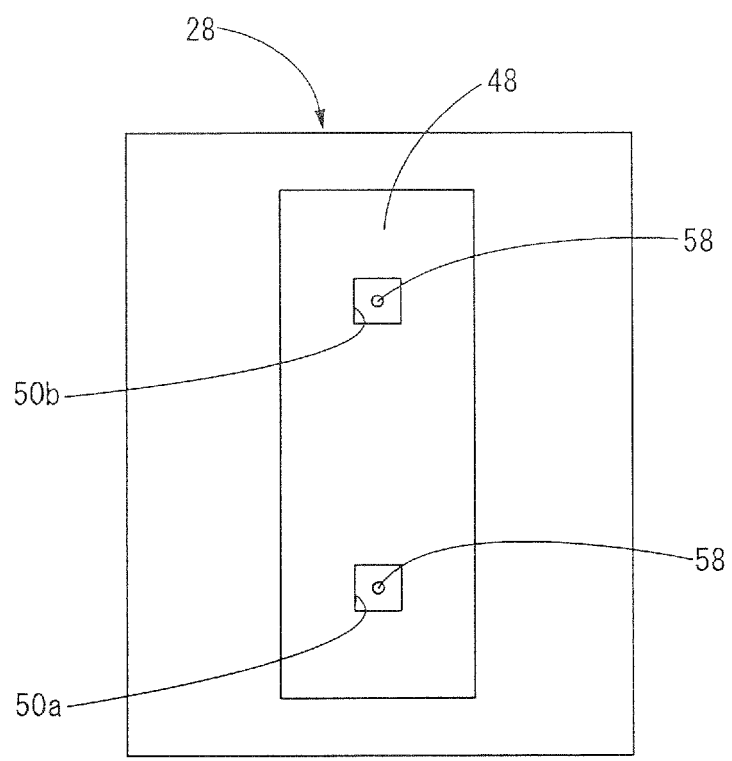
FIG. 5 is a bottom plan view of the other of the pair of primary forming molds of the primary molding unit included in the apparatus shown in FIG. 3.

As shown in FIGS. 3 and 5, the movable mold 28 has an overall shape of a rectangular block. A protruding portion 48 is provided so as to protrude downwardly from a horizontally central portion of the lower surface of the movable mold 28, which surface is remote from the movable platen 32 and opposed to the stationary mold 26. The lower surface of the protruding portion 48 opposed to the stationary mold 26 is flat and has a smaller dimension in the horizontal direction than and substantially the same dimension in the front-back direction as the top surface of the protruding portion 34 of the stationary mold 26. In the lower surface of the protruding portion 48 of the movable mold 28, two cavity portions 50a, 50b for forming cavities on the side of the movable mold are formed so as to be spaced apart from each other by a predetermined distance in the front-back direction. Both of the two cavity portions 50a, 50b have a shape corresponding to the external shape of the protrusion 18 of the base 12 of the desired two-color molded article 10. The two cavity portions 50a, 50b are located in the central portions of the respective two cavity portions 36a, 36b formed in the protruding portion 34 of the stationary mold 26, when the movable mold 28 and the stationary mold 26 are closed (see FIG. 6).

The movable mold 28 is moved toward the stationary mold 26 by the downward movement of the movable ram of the hydraulic cylinder (not shown) so as to close the movable mold 28 and the stationary mold 26. Then, the two cavity portions 50a, 50b formed in the protruding portion 48 of the movable mold 28 and the corresponding two cavity portions 36a, 36b formed in the protruding portion 34 of the stationary mold 26 form respective two primary molding cavities 52 (only one of which is shown in FIG. 6) having a shape corresponding to the external shape of the base 12.

A nozzle fitting portion 54 and a sprue 55 are provided in the movable platen 32 to which the movable mold 28 is attached. The nozzle fitting portion 54 is formed in the center portion of the top surface of the movable platen 32, which surface is remote from the movable mold 28. The nozzle fitting portion 54 is configured such that a nozzle 56 provided at the end of the first injection unit (not shown) is disposed in contact with the nozzle fitting portion 54 (see FIG. 6). The movable mold 28 is provided with two hot runners 58 (only one of which is shown in FIG. 3). The two hot runners 58 communicate with the sprue 55 and extend toward the respective two cavity portions 50a, 50b so as to be open to the respective two cavity portions 50a, 50b. Two sheathed heaters 60 are inserted in the respective two hot runners 58.

Thus, the primary molding unit 22 is configured such that the primary injection molding operation is conducted by closing the movable mold 28 and the stationary mold 26 and injecting the ABS resin as the first resin material in the molten state from the nozzle 56 of the first injection unit disposed in contact with the nozzle fitting portion 54, and through the hot runners 58, so as to fill the respective two primary molding cavities 52, 52 (see FIG. 7) with the ABS resin in the molten state.

The base 12 is molded within each of the two primary molding cavities 52 by the above-described primary injection molding operation. The two bases 12 are molded such that the protrusions 18 are molded within respective portions of the primary molding cavities 52 defined by the cavity portions 50a, 50b, while the casings 16 are molded within respective portions of the primary molding cavities 52 defined by the cavity portions 36a, 36b.

The casings 16 of the two bases 12 to be molded are larger than the protrusions 18, and the external surface areas of the casings 16 are larger than those of the protrusions 18. Accordingly, the internal surface areas of the cavity portions 36a, 36b are larger than those of the cavity portions 50a, 50b. Therefore, when the movable mold 28 and the stationary mold 26 are opened after the bases 12 are molded, the protrusions 18 are removed from the cavity portions 50a, 50b due to a difference between coefficient of friction between the protrusions 18 and the inner surfaces of the cavity portions 50a, 50b, and coefficient of friction between the casings 16 and the inner surfaces of the cavity portions 36a, 36b. Thus, the bases 12 are retained by the stationary mold 26 with the casings 16 being held within the cavity portions 36a, 36b. Further, the ABS resin in the molten state is injected into the two primary molding cavities 52 through the hot runners 58. Therefore, the resin is prevented from being solidified inside the hot runners 58 and adhering to the protrusions 18 of the bases 12 when the movable mold 28 and the stationary mold 26 are opened. This also assures that the bases 12 are retained by the stationary mold 26 with the casings 16 being held within the cavity portions 36a, 36b when the movable mold 28 and the stationary mold 26 are opened. In order to more surely enable the bases 12 to be retained by the stationary mold 26 when the movable mold 28 and the stationary mold 26 are opened, a known ejection mechanism (not shown) may be provided on the movable mold 28 such that the protrusions 18 of the bases 12 are ejected from the cavity portions 50a, 50b by the ejection mechanism when the movable mold 28 and the stationary mold 26 are opened. It is possible to employ various other known structures that ensure opening of the movable mold 28 and the stationary mold 26 while the bases 12 as the primary molded bodies are retained by the stationary mold 26 of the pair of primary forming molds.

As shown in FIGS. 3 and 4, the secondary molding unit 24 includes a pair of secondary forming molds in the form of a left slide mold 62 and a right slide mold 64, two injection units 66 (only one of which is illustrated in FIG. 3) constituting second injection units, and first and second hydraulic cylinders 68a, 68b serving as a second opening and closing device.

The right slide mold 64 of the secondary molding unit 24 consists of a block having an overall shape of a generally longitudinal rectangle. Two slots 70 are provided in the lower surface of the right slide mold 64 so as to be spaced apart from each other by a predetermined distance in the length direction of the right slide mold 64 (vertical direction as seen in FIG. 4) and extend parallel to each other in the width direction (horizontal direction as seen in FIG. 4). The right slide mold 64 has two protruding portions 72 integrally formed in respective opposite longitudinal end portions thereof and an upper portion thereof such that the protruding portions 72 protrude leftwardly in one of the opposite width directions of the right slide mold 64. Each of the two protruding portions 72 has a shape of a generally longitudinal rectangular block and includes a cavity portion 74 formed in the end portion. The cavity portion 74 takes the form of a rectangular cutout which is open leftwardly and downwardly, and has a shape corresponding to the right half of the external shape of the covering 14 of the desired two-color molded article 10.

The right slide mold 64 is placed on the fixing plate portion 42 of the support plate 40 fixed on the right step portion 38b of the stationary mold 26 of the primary molding unit 22. In this condition, the two slide rails 46, 46 formed in the fixing plate portion 42 are fit in the two slots 70, 70 formed in the lower surface of the right slide mold 64. The end portions of the two protruding portions 72, 72 are slidably placed on the protruding portion 34 of the stationary mold 26 so as to be located on the right side of the respective two cavity portions 36a, 36b formed in the horizontally central portion of the protruding portion 34 of the stationary mold 26.

A second hydraulic cylinder 68b is fixed to a surface of the supporting plate portion 44 of the support plate 40 (including the fixing plate portion 42 on which the right slide mold 64 is placed), which surface is remote from the surface opposed to the protruding portion 34 of the stationary mold 26. The second hydraulic cylinder 68b includes a piston rod 76b which extends through the supporting plate portion 44. The piston rod 76b is configured so as to be moved in the direction from the supporting plate portion 44 toward the protruding portion 34 of the stationary mold 26, and so as to be moved in the reverse direction. The piston rod 76b is fixed at its distal end to a side surface of the right slide mold 64 remote from the protruding portions 72.

Thus, as shown by two-dot chain lines in FIG. 4, the right slide mold 64 is configured to slide from right to left on the fixing plate portion 42 of the support plate 40 while being guided by the two slide rails 46, 46 formed on the support plate 40 as the piston rod 76b of the second hydraulic cylinder 68b is moved leftward. When the piston rod 76b reaches its leftward stroke end position, the end faces of the two protruding portions 72, 72 are located at the horizontally central position of the protruding portion 34 of the stationary mold 26, and the cavity portions 74, 74 formed in the two protruding portions 72, 72 are located above the respective two cavity portions 36a, 36b formed in the protruding portion 34 of the stationary mold 26.

On the other hand, the left slide mold 62 consists of a first block 78 having a configuration similar to the right slide mold 64, and two second blocks 80, 80 having a rectangular shape smaller than the first block 78 and fixed to the first block 78, as shown in FIGS. 3 and 4.

Namely, the first block 78 of the left slide mold 62 has a generally longitudinal rectangular shape. Two slots 70 are formed in the lower surface of the first block 78 so as to extend parallel to each other in the width direction of the first block 78 (horizontal direction as seen in FIG. 4). The first block 78 extending in the length direction (vertical direction as seen in FIG. 4) has two protruding portions 72 integrally formed in respective opposite longitudinal end portions thereof and in an upper portion thereof such that the protruding portions 72 protrude rightwardly in one of the opposite width directions of the first block 78. A cavity portion 82, which has a shape corresponding to the left half of the external shape of the covering 14 of the desired two-color molded article 10, is formed in the end portion of each of the two protruding portions 72, 72. The second blocks 80, 80 are bolted or otherwise fixed to opposite longitudinal end portions of a side surface of the first block 78, which side surface is remote from the protruding portions 72, 72.

In the apparatus 20 of this embodiment, two injection units 66 (only one of which is shown in FIG. 3) are assembled in the left slide mold 62 such that a part of each injection unit 66 is accommodated in the left slide mold 62.

More specifically described, two recesses 84 (only one of which is shown in FIG. 3) are formed in respective opposite longitudinal end portions of the first block 78 of the left slide mold 62 so as to be open in the side surface of the first block 78 to which the two second blocks 80, 80 are fixed, as shown in FIG. 3. Further, two hot runners 86 (only one of which is shown in FIG. 3) are provided in the first block 78 so as to extend from bottom surfaces of the respective two recesses 84 to the respective cavity portions 82, 82 formed in the end portions of the two protruding portions 72, 72, and so as to be open to the respective cavity portions 82. Two sheathed heaters 88 are inserted in the respective two hot runners 86.

Two insert holes 90 (only one of which is shown in FIG. 3) are provided in the respective two second blocks 80, 80 of the left slide mold 62 so as to extend from one of the opposite surfaces of the second block 80 to which the first block 78 is fixed, to the other surface, such that each of the two insert holes 90 is open at its opposite ends. The two insert holes 90 communicate with the two recesses 84 of the first block 78 through openings formed in the surface of the second block 80 to which the first block 78 is fixed. A resin material inlet 91 is provided in each of the second blocks 80, so as to be open in the upper surface of the second block 80 and in the inner surface of the insert hole 90 and extend in the vertical direction. Further, two mounting portions 92, 92 are formed integrally with each of the second blocks 80 so as to be spaced apart from each other by a predetermined distance, such that the two mounting portions 92, 92 extend from a side surface of the second block 80 opposite to the side surface to which the first block 78 is fixed.

On the other hand, each of the two injection units 66 has a well-known plunger structure. Namely, the injection unit 66 consists of a heating cylinder 94 and an air cylinder 98. The air cylinder 98 has a plunger rod 96, a part of which protrudes into the heating cylinder 94. In this embodiment, the heating cylinder 94 has a separate structure in which an end portion 100 and a base portion 102 are integrally assembled in the axial direction. Further, a band heater 104 is fitted in the end portion 100 of the heating cylinder 94, while a torpedo 106 is accommodated in the end portion 100. On the other hand, a through-hole 108 is provided at a circumferential position of the base portion 102 of the heating cylinder 94.

The end portion 100 of the heating cylinder 94 of the injection unit 66 is inserted into the recess 84 of the first block 78, with its open end communicating with the hot runner 86. Further, the distal end portion of the base portion 102 of the heating cylinder 94 is inserted into the insert hole 90 of the second block 80 which communicates with the recess 84 into which the end portion 100 is inserted. In this condition, the through-hole 108 provided in the base portion 102 communicates with the resin material inlet 91 of the second block 80. On the other hand, the proximal portion of the base portion 102 of the heating cylinder 94 is disposed between the two mounting portions 92, 92 of the second block 80 so as to extend parallel to the mounting portions 92, 92. The air cylinder 98 is bolted or otherwise attached to the two mounting portions 92, 92 of the second block 80.

Thus, the two injection units 66 are attached to the left slide mold 62 so as to be movable with the left slide mold 62, with a part of the injection units 66 being accommodated in the left slide mold 62 such that the heating cylinders 94 communicate at their open ends with the respective two hot runners 86 provided in the first block 78 of the left slide mold 62. In this condition wherein the two injection units 66 are attached to the left slide mold 62, the second resin material in the form of pellets of polypropylene is supplied to the heating cylinders 94 through the resin material inlets 91 provided in the two second blocks 80.

The left slide mold 62 to which the two injection units 66 are attached is placed on the fixing plate portion 42 of the support plate 40 fixed to the left step portion 38a of the stationary mold 26 of the primary molding unit 22. In this condition, the two slide rails 46, 46 provided on the fixing plate portion 42 are fit in the two slots 70, 70 of the left slide mold 62. Further, the end portions of the two protruding portions 72, 72 of the left slide mold 62 are slidably placed on the protruding portion 34 of the stationary mold 26 so as to be located on the left side of the respective two cavity portions 36a, 36b provided in the horizontally central portion of the protruding portion 34 of the stationary mold 26. The two second blocks 80, 80 of the left slide mold 62 are slidably fit in respective two cutouts 110, 110 formed in the supporting plate portion 44 of the support plate 40.

The first hydraulic cylinder 68a is fixed to a surface of the supporting plate portion 44 of the support plate 40 having the two cutouts 110, 110 so as to be located between the two cutouts 110, 110, which surface is remote from the surface opposed to the protruding portion 34 of the stationary mold 26. The first hydraulic cylinder 68a includes a piston rod 76a which penetrates through the supporting plate portion 44 and which is moved in a direction from the supporting plate portion 44 toward the protruding portion 34, and in the reverse direction. The piston rod 76a is fixed to a side surface of the left slide mold 62 remote from the protruding portions 72, 72.

Thus, as shown by two-dot chain lines in FIG. 4, the left slide mold 62 is configured to slide from left to right on the fixing plate portion 42 of the support plate 40 together with the two injection units 66 attached thereto, while being guided by the two slide rails 46, 46 on the support plate 40 as the piston rod 76a of the first hydraulic cylinder 68a is moved rightward. Further, when the piston rod 76a reaches its rightward stroke end position, the end faces of the two protruding portions 72, 72 are located in the horizontally central position of the protruding portion 34 of the stationary mold 26, and the cavity portions 82, 82 formed in the two protruding portions 72, 72 are located above the respective two cavity portions 36a, 36b formed in the protruding portion 34 of the stationary mold 26.

Figure 9:
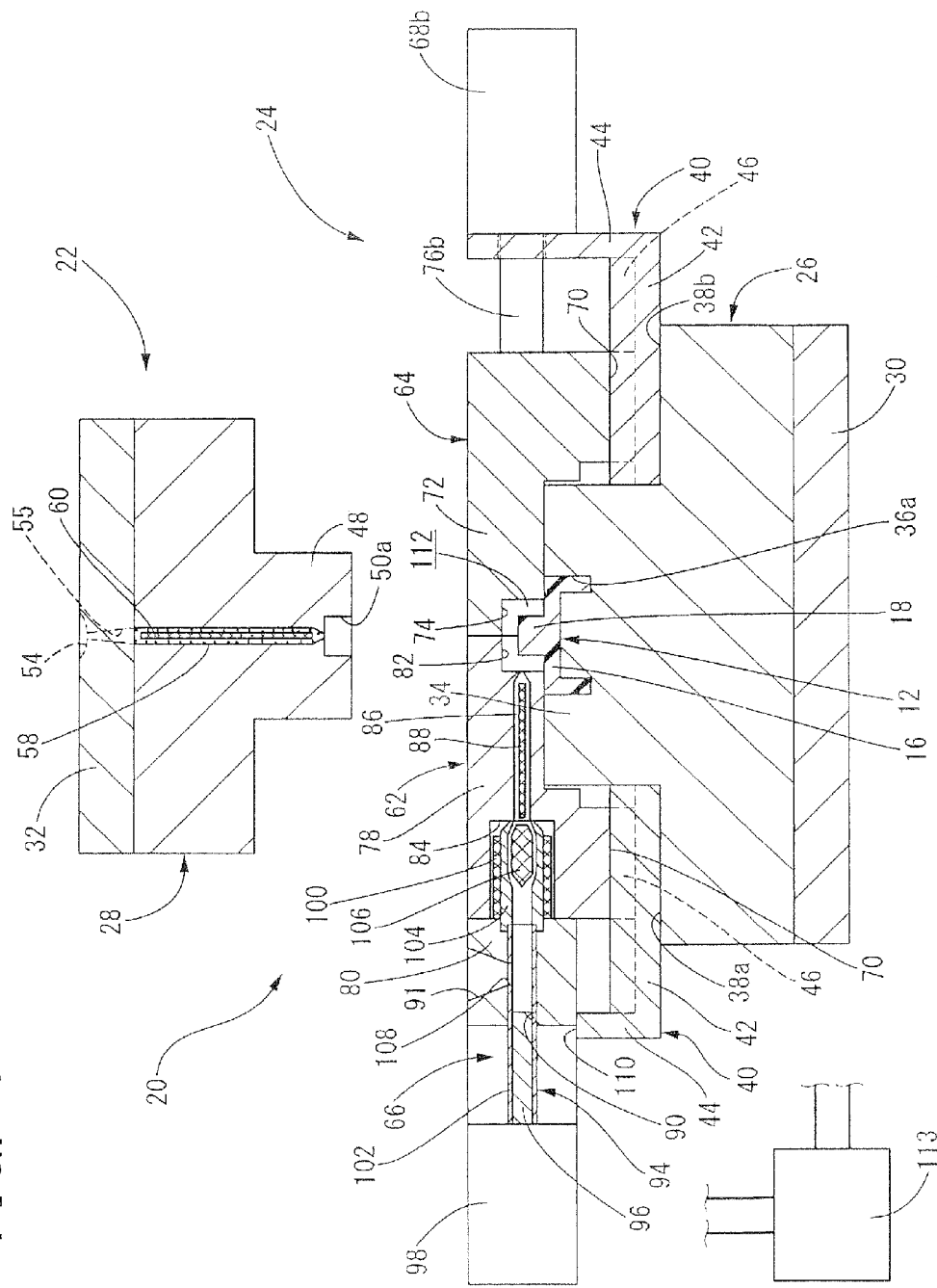
FIG. 9 is a view of a step following the step shown in FIG. 8, showing a secondary molding cavity formed between the pair of secondary forming molds of the secondary molding unit.

As described above, the apparatus 20 of this embodiment is configured such that the left slide mold 62 and the right slide mold 64 are moved toward each other in the horizontal direction perpendicular to the opening and closing direction of the stationary mold 26 and the movable mold 28 (vertical direction), by operations of the first hydraulic cylinder 68a and the second hydraulic cylinder 68b, so as to close the left and right slide molds 62, 64. When the left and right slide molds 62, 64 are closed, two secondary molding cavities 112 (only one of which is shown in FIG. 9) are formed therebetween by the cavity portions 82, 82 and the corresponding cavity portions 74, 74, so as to have a shape corresponding to the external shape of the covering 14 of the two-color molded article 10. The two secondary molding cavities 112 are located above the respective two cavity portions 36a, 36b such that the protrusions 18 of the bases 12 formed by the primary injection molding operation and retained by the stationary mold 26 are accommodated in the respective secondary molding cavities 112, as described later (see FIG. 9).

Figure 10:
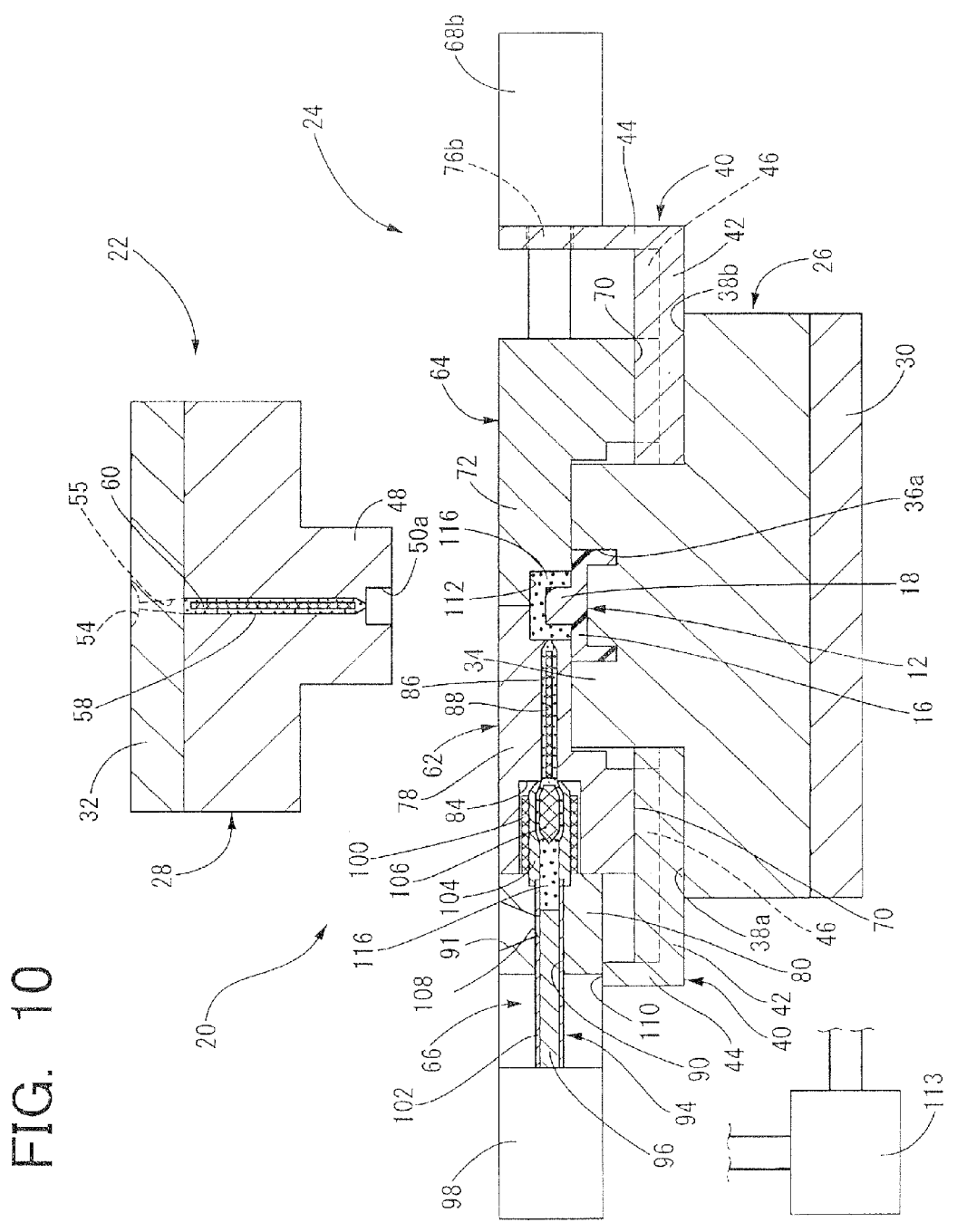

Thus, the secondary molding unit 24 is configured such that the secondary injection molding operation is conducted, with the left and right slide molds 62, 64 being placed in the closed state, by injecting polypropylene in a molten state from the open ends of the heating cylinders 94 of the two injection units 66 attached to the left slide mold 62, through the hot runners 86 so as to fill the respective two secondary molding cavities 112 (see FIG. 10). Thus, the coverings 14 are molded inside the respective two secondary molding cavities 112 by the secondary injection molding operation so as to cover the protrusions 18 of the bases 12 accommodated in the respective two secondary molding cavities 112.

As shown in FIG. 3, the apparatus 20 of this embodiment includes a control unit 113 which controls operation of the hydraulic cylinder (not shown) for closing and opening the stationary mold 26 and the movable mold 28 of the primary molding unit 22, operation of the injection unit (not shown) of the primary molding unit 22, operation of the first and second hydraulic cylinders 68a, 68b for closing and opening the left and right slide molds 62, 64 of the secondary molding unit 24, and operation of the two injection units 66 of the secondary molding unit 24. The control unit 113 has a well-known structure incorporating a computer, for example. In the production of the desired two-color molded article, the control unit 113 controls the above-described operations, making it possible to conduct the primary injection molding operation by the primary molding unit 22 and the secondary injection molding operation by the secondary molding unit 24 at respective appropriate timings according to the process described later. Further, it is possible to operate only the primary molding unit 22 without the operation of the secondary molding unit 24, while the left and right slide molds 62, 64 of the secondary molding unit 24 are open, as required. Thus, it is possible to successively produce a plurality of primary molded bodies in the form of the bases 12.

The desired two-color molded article 10 is produced according to the process described below by using the apparatus 20 of this embodiment configured as described above.

First, the left and right slide molds 62, 64 are opened by operating the first and second hydraulic cylinders 68a, 68b of the secondary molding unit 24 so as to move the left and right slide molds 62, 64 apart from each other as shown in FIG. 6. In this condition, the stationary mold 26 and the movable mold 28 are closed by operating the hydraulic cylinder (not shown) of the primary molding unit 22 so as to move the movable mold 28 downwardly. Thus, the two primary molding cavities 52 (only one of which is shown in FIG. 6) are formed between the stationary mold 26 and the movable mold 28. Further, in this condition in which the stationary mold 26 and the movable mold 28 are closed, the nozzle 56 of the injection unit (not shown) of the primary molding unit 22 is brought into contact with the nozzle fitting portion 54 of the movable mold 28.

Figure 7:
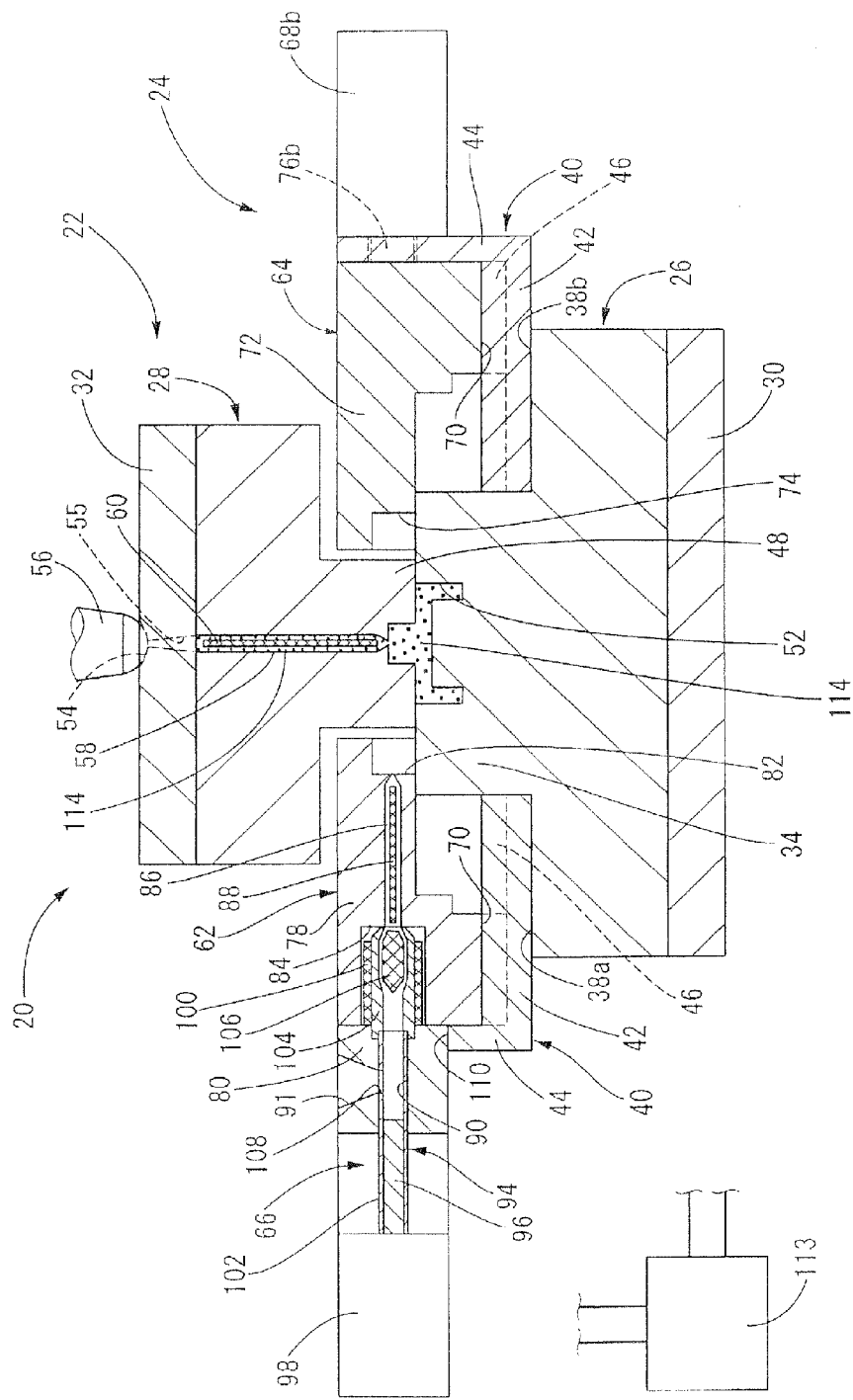
FIG. 7 is a view of a step following the step shown in FIG. 6, showing a first resin material injected to fill the primary molding cavity formed between the pair of primary forming molds of the primary molding unit.

Then, the ABS resin 114 in a molten state is injected from the injection unit through the nozzle 56 such that the ABS resin 114 is injected into the two primary molding cavities 52 through the hot runners 58 as shown in FIG. 7. Then, the ABS resin 114 injected to fill the primary molding cavities 52 is cooled to solidify. Thus, the bases 12 are molded within the respective primary molding cavities 52 by the primary injection molding operation.

Figure 8:
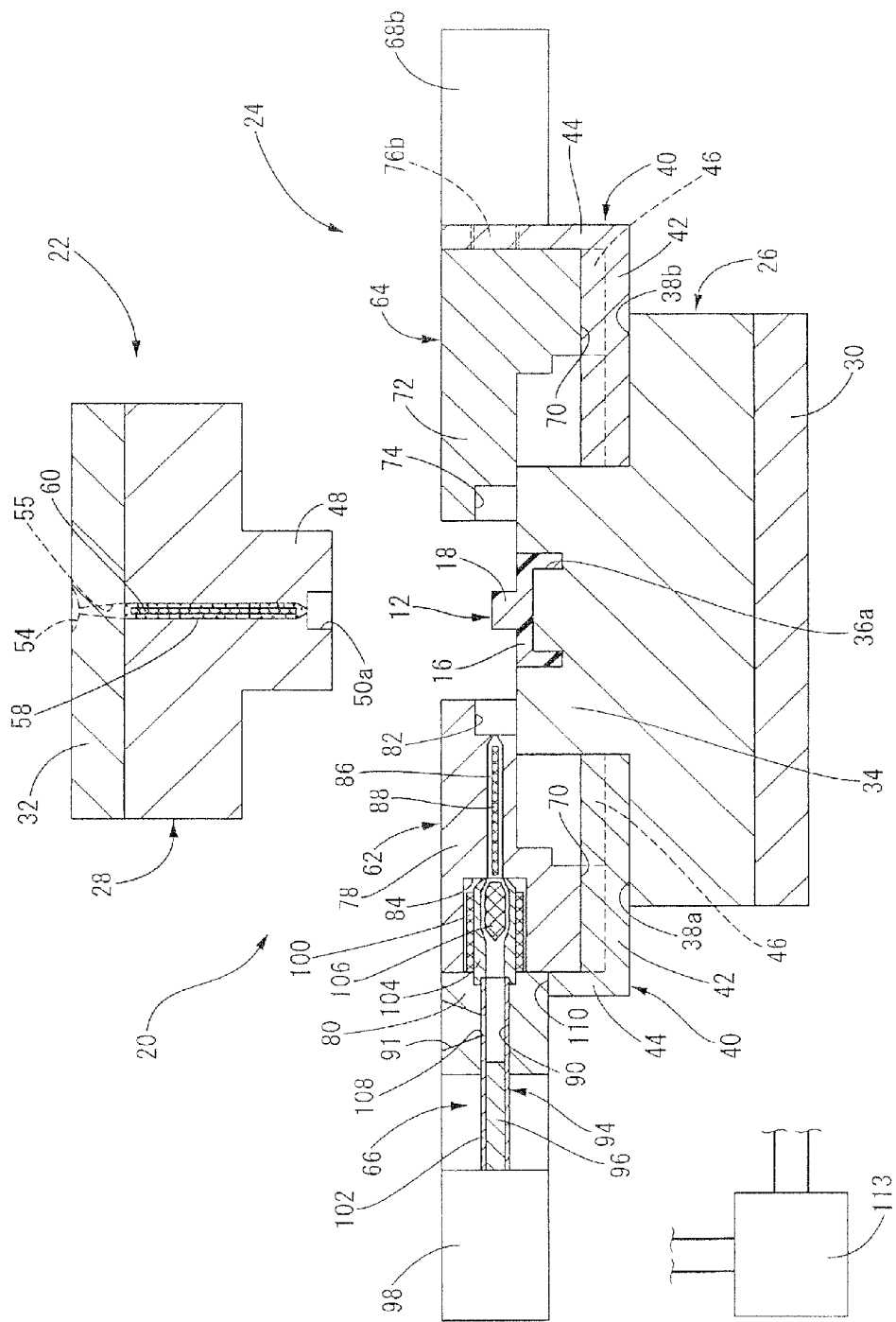
FIG. 8 is a view of a step following the step shown in FIG. 7, showing the pair of primary forming molds of the primary molding unit opened after the primary molded body is molded.

After the bases 12 are molded within the primary molding cavities 52, the stationary mold 26 and the movable mold 28 are opened by operating the hydraulic cylinder (not shown) of the primary molding unit 22 so as to move the movable mold 28 upwardly as shown in FIG. 8. At this time, the molded bases 12 are removed from the upwardly moved movable mold 28 and retained by the stationary mold 26 with the casings 16 being held in the respective two cavity portions 36a, 36b of the stationary mold 26 and with the protrusions 18 being exposed outside of the cavities 52. In the primary injection molding operation of the bases 12, the ABS resin 114 is injected from the injection unit to fill the primary molding cavities 52 through the hot runners 58 such that the bases 12 are molded without formation of runners. Therefore, it is not necessary to cut off the runners which would be formed in the bases 12 removed from the movable mold 28.

Then, each of the left slide mold 62 and the right slide mold 64 is slid along the two slide rails 46, 46 provided on each of the left and right step portions 38a, 38b, by operating the first and second hydraulic cylinders 68a, 68b of the secondary molding unit 24 so as to move the left and right slide molds 62, 64 toward each other as shown in FIG. 9. Thus, the left and right slide molds 62, 64 are closed so as to form the two secondary molding cavities 112 (only one of which is shown in FIG. 9) therebetween.

At this time, the cavity surface of each secondary molding cavity 112 is defined by the inner surface of the cavity portion 82, the inner surface of the cavity portion 74, the outer surface of the protrusion 18 of the base 12 retained by the stationary mold 26, and a portion of the top surface of the casing 16 of the base 12 around the protrusion 18. Thus, each secondary molding cavity 112 is formed so as to accommodate the protrusion 18 of the base 12 formed by the primary injection molding operation. In the formation of the secondary molding cavity 112 accommodating the protrusion 18 of the base 12, it is possible to concurrently conduct the operations of opening the stationary mold 26 and the movable mold 28, and closing the left slide mold 62 and the right slide mold 64, thereby reducing the time required for the molding cycle of the desired two-color molded article 10.

Then, the polypropylene 116 in a molten state is injected from the two injection units 66 (only one of which is shown in FIG. 10) accommodated in the left slide mold 62 as shown in FIG. 10. The polypropylene 116 in the molten state is injected into the two secondary molding cavities 112 through the two hot runners 86 (only one of which is shown in FIG. 10). Then, the polypropylene 116 injected to fill the secondary molding cavities 112 is cooled to solidify. Thus, the coverings 14 are molded within the respective two secondary molding cavities 112 by the secondary injection molding operation. The thus molded two coverings 14 (only one of which is shown in FIG. 10) are superposed on the bases 12 accommodated in the respective two secondary molding cavities 112, so as to cover the protrusions 18. At this time, the coverings 14 are not bonded to the protrusions 18 of the bases 12 since the coverings 14 are made of the polypropylene while the bases 12 are made of the ABS resin.

Figure 11:
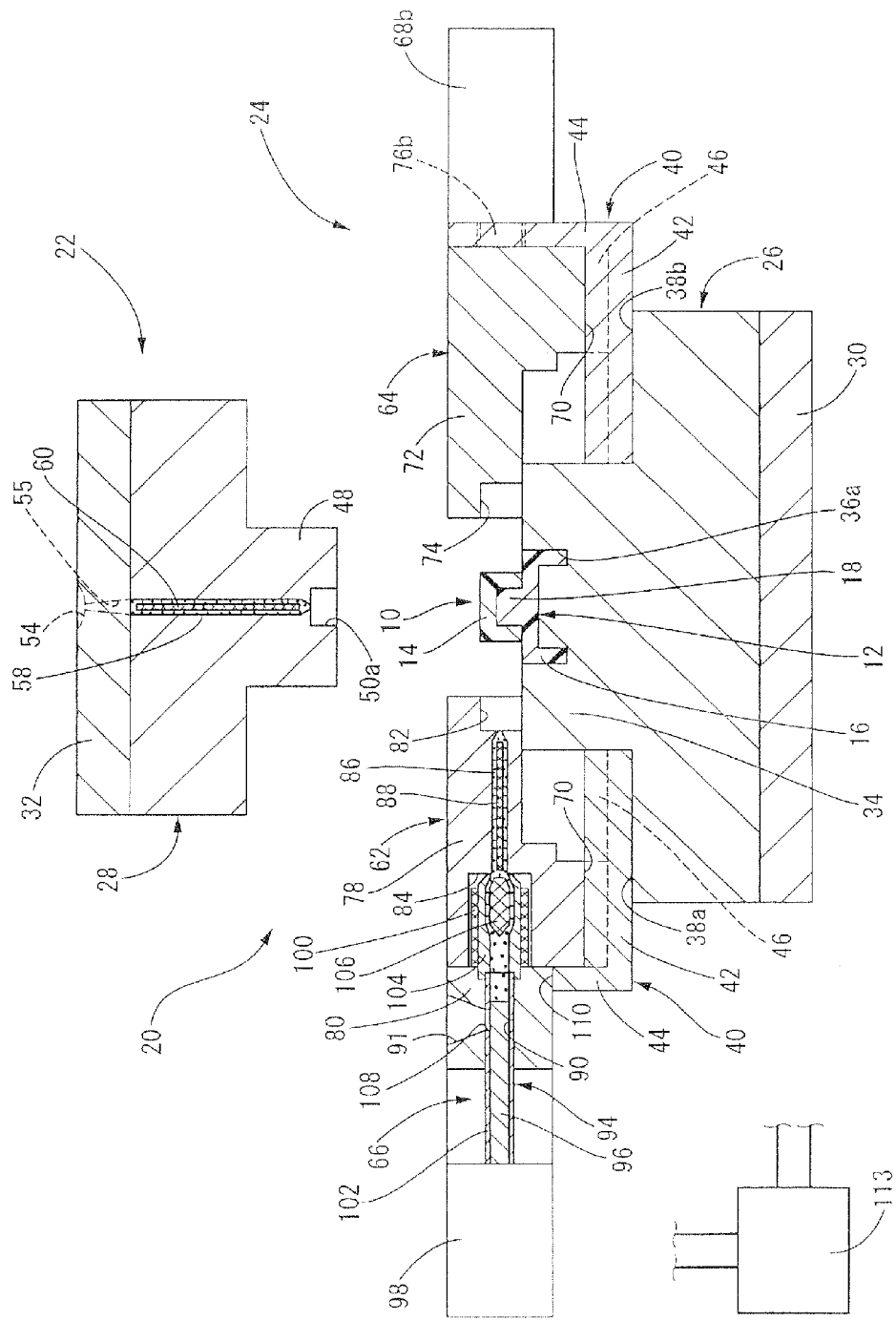
FIG. 11 is a view of a step following the step shown in FIG. 10, showing the pair of secondary forming molds of the secondary molding unit opened after the secondary molded body is molded.

Then, the left slide mold 62 and the right slide mold 64 are opened by operating the first and second hydraulic cylinders 68a, 68b of the secondary molding unit 24 so as to move the left and right slide molds 62, 64 apart from each other as shown in FIG. 11. Thus, the two coverings 14 are removed from the left slide mold 62 and the right slide mold 64. At this time, the coverings 14 are kept fitted and superposed on the respective protrusions 18 of the bases 12 which are retained by the stationary mold 26. In the secondary injection molding operation of the coverings 14, the polypropylene is injected from the injection units 66 to fill the secondary molding cavities 112 through the hot runners 86 such that the coverings 14 are molded without formation of runners. Therefore, it is not necessary to cut off the runners which would be formed in the coverings 14 removed from the left and right slide molds 62, 64.

The two desired two-color molded articles 10 (only one of which is shown in FIG. 11) having a laminar structure consisting of the base 12 and the covering 14 superposed on the protrusion 18 of the base 12 are simultaneously produced as described above. The two-color molded articles 10 are ejected and removed from the stationary mold 26 by an ejection mechanism (not shown) provided on the stationary mold 26, for example.

As is apparent from the foregoing description, the apparatus 20 of this embodiment is configured such that the two injection units 66, 66 of the secondary molding unit 24 are attached to the left slide mold 62 so as to be partially accommodated in the two recesses 84, 84 and the two insert holes 90, 90 of the left slide mold 62, and so as to be movable with the left slide mold 62. Therefore, unlike the conventional apparatus wherein the injection unit of the secondary molding unit is disposed independently of the secondary forming mold, the apparatus 20 of this embodiment can advantageously reduce the space required for disposing the injection units 66, 66 of the secondary molding unit 24. Thus, the apparatus 20 of this embodiment can be effectively downsized. Since the injection units 66, 66 of the secondary molding unit 24 are made small enough to be partially accommodated in the left slide mold 62, the cost of the injection units 66, 66 is reduced, so that the production cost of the desired two-color molded article can be advantageously reduced.

Further, the apparatus 20 of this embodiment is configured such that the primary molding cavity 52 for molding the primary molded body in the form of the base 12 is formed between the stationary mold 26 and the movable mold 28 of the primary molding unit 22, while the secondary molding cavity 112 for molding the secondary molded body in the form of the covering 14 is formed between the left slide mold 62 and the right slide mold 64 of the secondary molding unit 24. Therefore, it is possible to determine the shape of the secondary molding cavity 112 independently of the shape of the primary molding cavity 52. Accordingly, the secondary molded body in the form of the covering 14 can be advantageously produced so as to have any desired shape independently of the shape of the primary molded body in the form of the base 12.

The apparatus 20 is further configured such that a plurality of primary molded bodies in the form of the bases 12 can be successively produced while the left and right slide molds 62, 64 are open by operating only the primary molding unit 22 without operation of the secondary molding unit 24, under the control of the control unit 113. Therefore, the apparatus 20 can be extremely advantageously used as the general injection molding apparatus for producing the desired molded article by a single primary injection molding operation. Accordingly, the apparatus 20 of this embodiment can be advantageously used for both purposes of producing the two-color molded article 10 and producing the molded body obtained by a single primary injection molding operation. As a result, the apparatus 20 of this embodiment effectively has an extremely high degree of utility not found in the conventional apparatus.

The apparatus 20 of this embodiment is further configured such that after the primary injection molding operation is conducted and the movable and stationary molds 26, 28 are opened, the secondary molding cavities 112 are formed between the left and right slide molds 62, 64 so as to accommodate the protrusions 18 of the bases 12 in the secondary molding cavities 112, by merely moving the left and right slide molds 62, 64 of the secondary molding unit 24 toward each other, and without moving the stationary mold 26 which retains the primary molded bodies in the form of the bases 12. Further, it is possible to concurrently conduct the operations of opening the stationary and movable molds 26, 28 and closing the left and right slide molds 62, 64.

Therefore, unlike the conventional apparatus having two stationary molds disposed on a turntable, for example, wherein the turntable is rotated after conducting the primary injection molding operation and opening the stationary molds and corresponding movable molds, so as to move the stationary molds retaining the primary molded bodies, and then, the stationary and movable molds are closed so as to form the secondary molding cavities, the apparatus 20 of this embodiment advantageously reduces the molding cycle time of the desired two-color molded article 10 by eliminating the time required for moving the stationary mold 26 retaining the primary molded bodies in the form of the bases 12, and by concurrently conducting the operations of opening the stationary and movable molds 26, 28, and closing the left and right slide molds 62, 64.

While one embodiment of the present invention has been described in detail, for the illustrative purpose only, it is to be understood that the invention is not limited to the details of the illustrated embodiment.

In the above-described embodiment, the two primary molding cavities 52 are formed between the stationary mold 26 and the movable mold 28 of the primary molding unit 22, and the two secondary molding cavities 112 are formed between the left slide mold 62 and the right slide mold 64 of the secondary molding unit 24, thereby making it possible to simultaneously produce two pieces of the two-color molded article 10. However, it is also possible to configure the apparatus so as to form only one primary molding cavity 52 or more than three primary molding cavities 52 between the stationary and movable molds 26, 28, and to form only one secondary molding cavity 112 or more than three secondary molding cavities 112 between the left and right slide molds 62, 64. In the case where a plurality of primary molding cavities 52 are formed, a plurality of first injection units corresponding to the plurality of primary molding cavities 52 may be provided for injecting the first resin material to fill the respective primary molding cavities 52.

In the case where a plurality of secondary molding cavities 112 are formed between the left and right slide molds 62, 64, the second resin material may be injected from a single injection unit 66 into all of the plurality of secondary molding cavities 112.

The injection unit 66 which is attached to the left slide mold 62 of the secondary molding unit 24, and at least a part of which is accommodated in the left slide mold 62, may have a structure other than the above-described structure. Namely, instead of the injection unit 66 having the plunger structure employed in the above-described embodiment, an injection unit which has any known structure and which is used for in-line screw injection molding or preplasticating injection molding, for example, can be suitably employed.

Further, in the above-described embodiment, the hot runners 58, 86 provided with the respective sheathed heaters 60, 88 inserted therein are respectively provided in the movable mold 26 of the primary molding unit 22 and in the left slide mold 62 of the secondary molding unit 24 accommodating a part of the injection unit 66. The first resin material in the form of the ABS resin 114 and the second resin material in the form of the polypropylene 116 are respectively injected into the primary molding cavity 52 and the secondary molding cavity 112 through the respective hot runners 58, 86. However, it is also possible to provide the movable mold 26 and the left slide mold 62 with cold runners which are not provided with heating devices such as the sheathed heaters 60, 88 to inject the first and second resin materials into the primary and secondary molding cavities 52, 112 through the cold runners.

The opening and closing direction of the pair of primary forming molds of the primary molding unit (the stationary mold 26 and the movable mold 28 in the above-described embodiment) and the opening and closing direction of the pair of secondary forming molds of the secondary molding unit (the left slide mold 62 and the right slide mold 64 in the above-described embodiment) are not limited to the above-described directions as long as the directions are perpendicular to each other.

It is to be understood that the configuration for retaining the primary molded body in one of the pair of primary forming molds while the pair of primary forming molds being opened is not limited to the above-described configuration. For example, it is possible to provide the cavity surface of the other primary forming mold with a draft angle or the like, which makes it easier to remove the primary molded body from the above-indicated other primary forming mold. Further, it is possible to provide the above-indicated one primary forming mold with a configuration which makes it more difficult to remove the primary molded body from the above-indicated one primary forming mold.

It is possible to replace the devices for opening and closing the pairs of the primary and secondary forming molds using the hydraulic cylinders provided in the above-described embodiment, with a device which uses any one of various known actuators.

The kinds of the first and second resin materials are not limited. The first and second resin materials may be the same or different from each other. By using the same kind of material as the first and second resin materials, it is possible to easily obtain a two-color molded article consisting of the primary and secondary molded bodies bonded together.

While the above-described embodiment of the present invention is applied to the apparatus for and method of producing a two-color molded article consisting of a base and a covering superposed on the base, it is to be understood that the principle of the present invention can be advantageously applied to any apparatus for and method of producing various kinds of two-color molded articles consisting of the primary molded body and the secondary molded body superposed on the primary molded body.

It is to be understood that the present invention may be embodied with various other changes and modifications which may occur to those skilled in the art, without departing from the spirit of the invention and that the present invention comprehends such embodiments.

NOMENCLATURE OF ELEMENTS

10: Two-color molded article
12: Base
14: Cover
20: Apparatus
22: Primary molding unit
24: Secondary molding unit
26: Stationary mold
28: Movable mold
46: Slide rail
52: Primary molding cavity
62: Left slide mold
64: Right slide mold
66: Injection unit
68a: First hydraulic cylinder
68b: Second hydraulic cylinder
70: Slot
112: Secondary molding cavity
114: ABS resin
116: Polypropylene

The invention claimed is:

1. An apparatus for producing a two-color molded article consisting of a primary molded body molded by a primary injection molding operation using a first resin material, and a secondary molded body which is molded by a secondary injection molding operation using a second resin material and which is superposed on the primary molded body, the apparatus comprising:

a primary molding unit for molding the primary molded body by the primary injection molding operation, comprising a first opening and closing device, a pair of primary forming molds which are closed by the first opening and closing device to form therebetween a primary molding cavity having a shape corresponding to the primary molded body, and a first injection unit for injecting the first resin material into the primary molding cavity; and a secondary molding unit for molding the secondary molded body by the secondary injection molding operation, comprising a second opening and closing device, a pair of secondary forming molds which are closed by the second opening and closing device to form therebetween a secondary molding cavity having a shape corresponding to the secondary molded body, and a second injection unit for injecting the second resin material into the secondary molding cavity, and wherein:

the pair of primary forming molds are opened by the first opening and closing device while retaining the primary molded body by one of the pair of primary forming molds of the primary molding unit;

the second injection unit of the secondary molding unit is assembled in one of the pair of secondary forming molds with at least a part of the second injection unit being accommodated in said one of the pair of secondary forming molds such that the second injection unit is movable with said one secondary forming mold; and the pair of secondary forming molds are disposed on respective opposite sides of the pair of primary forming molds and are movable toward and away from each other in a direction perpendicular to a direction in which the pair of primary forming molds are opened and closed, the pair of secondary forming molds being moved toward each other and closed by the second opening and closing device while the pair of primary forming molds are open such that the secondary molding cavity is formed so as to accommodate at least a part of the primary molded body retained by said one primary forming mold.

2. The apparatus according to claim 1, wherein slide rails are provided on respective opposite sides of a part of said one of the pair of primary forming molds, which part retains the primary molded body while the pair of primary forming molds are open, the slide rails extending in the direction perpendicular to the direction in which the pair of primary forming molds are opened and closed, the pair of secondary forming molds being moved toward and away from each other by the second opening and closing device, while being guided by the slide rails.

3. The apparatus according to claim 2, wherein the second opening and closing device is constituted by a pair of cylinders, and supporting portions are provided on respective opposite sides of said part of the one of the pair of primary forming molds, which part retains the primary molded body, the pair of cylinders being supported by the supporting portions and connected to the pair of secondary forming molds, the pair of secondary forming molds being closed and opened by operations of the pair of cylinders.

4. The apparatus according to claim 1, further comprising a control unit for controlling operation of the first opening and closing device, operation of the second opening and closing device, operation of the first injection unit and operation of the second injection unit, the first opening and closing device and the first injection unit being operated without the operations of the second opening and closing device and the second injection unit, under control of the control unit such that only the primary injection molding operation is conducted by the primary molding unit.

5. The apparatus according to claim 1, wherein a hot runner is provided in each of at least one of the pair of primary forming molds, and the first resin material is injected from the first injection unit into the primary molding cavity through the hot runner.

6. The apparatus according to claim 1, wherein a hot runner is provided in each of at least one of the pair of secondary forming molds, and the second resin material is injected from the second injection unit into the secondary molding cavity through the hot runner.

7. The apparatus according to claim 1, wherein a recess is provided in one of the pair of secondary forming molds, and at least a part of the second injection unit is accommodated in the recess.

8. A method of producing a two-color molded article consisting of a primary molded body molded by a primary injection molding operation using a first resin material, and a secondary molded body which is molded by a secondary injection molding operation using a second resin material and which is superposed on the primary molded body, comprising the steps of:

forming a primary molding cavity for molding the primary molded body by closing a pair of primary forming molds;

performing the primary injection molding operation by injecting the first resin material in a molten state into the primary molding cavity and solidifying the first resin material in the primary molding cavity;

opening the pair of primary forming molds while retaining the primary molded body molded by the primary injection molding operation by one of the pair of primary forming molds;

closing a pair of secondary forming molds disposed on respective opposite sides of the pair of primary forming molds so as to be movable toward and away from each other in a direction perpendicular to a direction in which the pair of primary forming molds are opened and closed, while the pair of primary forming molds are open, thereby forming a secondary molding cavity for molding the secondary molded body so as to accommodate at least a part of the primary molded body retained by said one of the pair of primary forming molds; and performing the secondary injection molding operation by injecting the second resin material in a molten state into the secondary molding cavity by an injection unit which is assembled in one of the pair of secondary forming molds with at least a part of the injection unit being accommodated in said one of the pair of secondary forming molds so as to be movable with said one secondary forming mold, and solidifying the second resin material in the secondary molding cavity so as to form the secondary molded body superposed on the primary molded body accommodated in the secondary molding cavity.

* * * * *